Figure 1:
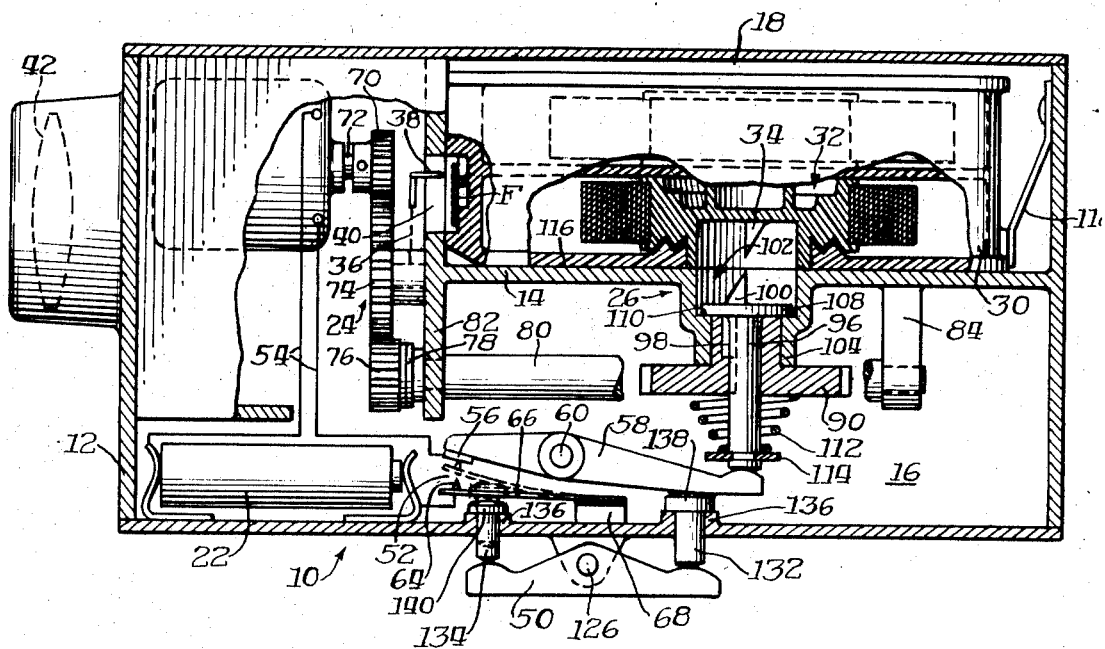

United States Patent
Koeber

[15] 3,700,317
[45] Oct. 24, 1972

[54] RETRACTED FILM TAKE-UP DRIVER
[72] Inventor: Henry J. Koeber, Deerfield, Ill.
[73] Assignee: Bell & Howell Company, Chicago, Ill.
[22] Filed: Aug. 26, 1970
[21] Appl. No.: 67,112

[52] U.S. Cl. .................................... 352/91, 242/200
[51] Int. Cl. ............................................. G03b 1/04
[58] Field of Search .................. 352/72, 91; 242/200

[56] References Cited
UNITED STATES PATENTS
3,514,197  5/1970  Koji Sho .................... 352/91
3,550,983  12/1970  Probst ....................... 242/200

*Primary Examiner*—S. Clement Swisher
*Attorney*—William F. Pinsak, John E. Peele, Jr., Kenneth W. Greb and William K. Serp

[57] ABSTRACT

For use in a camera having film transported for take-up on a unidirectionally operable take-up member, a take-up drive selectively engageable with the member to rotate that member and connected to the camera drive so as to be rotated continuously during camera operation. For normal operation of the camera, a manually operable control actuates the camera motor energizing circuit and simultaneously moves the take-up driver into operative engagement with the film take-up member. When the control is released, the camera is de-actuated and the take-up is retracted. A second control is arranged to actuate the camera without engaging the take-up member with the take-up driver wherein exposed film accumulates in the film chamber but is not taken-up. This accumulated length of once exposed film is available for rewinding and re-exposure as is desirable in making lap dissolve sequences.

7 Claims, 2 Drawing Figures

Patented Oct. 24, 1972

3,700,317

Inventor:
Henry J. Koeber.
By William L. Pinsk
John E. Peek Jr. Attys

RETRACTED FILM TAKE-UP DRIVER

This invention relates to camera apparatus for facilitating double exposure of film, and further facilitating insertion and removal of a film cartridge into and from the camera.

Certain known photographic techniques available to professional motion picture photographers are desirable for use by the so-called amateur or "home movie" photographers, but due to equipment limitations, cannot be taken advantage of. Techniques, such as lap dissolve photography, are precluded when using the more common equipment in which the film take-up is unidirectionally driven. This problem becomes apparent in view of the steps involved in making a lap dissolve sequence. That is, a first series of images is recorded on a length of film with the last few frames of the sequence being a "fade-out" caused by gradually reducing exposure from the normal exposure value. The latter portion of film is rewound for a second exposure with the re-exposure of the faded out frames being gradually increased to normal as a "fade-in." In cameras accepting film cartridges having only a unidirectionally operable take-up member, the film cannot be re-wound for re-exposure when that film has been taken up. Further, to effect rewinding of the film in such cartridges would require total destruction of the anti-rewind device and possible destruction of the cartridge. Hence, the take-up drive of cameras accepting cartridges of the class referred to must be modified to enable such cartridges to be used to enable practice of techniques such as lap dissolve photography.

Certain prior art devices have been designed to permit making of lap dissolve sequences with a camera of the type mentioned above, but these mechanisms are complicated and cumbersome to operate. In these patents, the take-up is stopped to accumulate within the film supply the required length of film to be again exposed. Because the take-up driver is continuously in engagement with the driven take-up member about which film is wound, the mechanism becomes extremely complex. In such mechanisms, the drive to the take-up must be disengaged requiring the presence of a clutch to disengage the drive and blocking members to maintain the driver against the rotation for a predetermined period of time. For these reasons, the mechanism of the present invention is seen to be more desirable for simplicity.

In the present structure, an actuator member movable responsive to a camera control moves the take-up driver into operative position and closes a switch for operating the camera and take-up simultaneously. When the control is released, a spring moves the take-up driver out of operative position. A second actuator member operative by the camera control is actuable to close the switch to operate the camera but without causing the rotating take-up driver to engage in the take-up of the film supply. Since the film take-up is not driven, a length of film is permitted to be transported into the film supply and is available for rewinding for subsequent second exposure.

Suitable structure by means of which the above mentioned and other advantages of the invention are obtained will be fully described in the following specification, taken in conjunction with the accompanying drawings showing a preferred embodiment of the invention.

Figure 2:
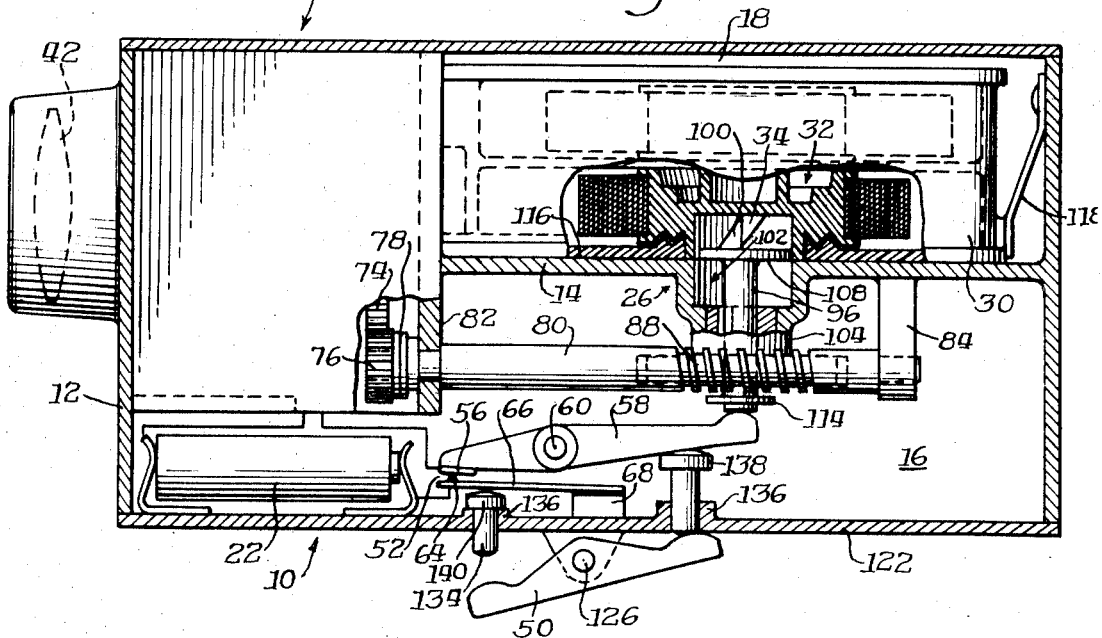

In the drawings:

FIG. 1 is a cross sectional plan view of a camera embodying the invention, with a take-up driver retracted and disengaged from the take-up of the film supply, with portions thereof broken away to facilitate illustration; and FIG. 2 is a view similar to FIG. 1 with the take-up in engagement with the take-up of the film supply.

Referring to the drawings, a camera designated generally by numeral 10 is shown as comprising a housing 12 divided internally by a partition 14 into a mechanism chamber 16 and a film chamber 18. Enclosed within the mechanism chamber is a motive means, shown as a small DC motor 20, a power supply means shown as batteries 22, a transmission 24, and a take-up drive assembly 26. Enclosable within the film chamber is a film supply shown as a cartridge 30 which may be of the type such as Super 8 cartridges which have a unidirectionally operable film take-up 32, including a drivable pusher finger 34 by which the take-up is rotated. In addition to driving take-up assembly 26, motor 30 simultaneously drives a film transport coupling 36 by which a film transport or shuttle 38 moves film F past an exposure aperture 40 on which light from objective 42 may impinge. After exposure at aperture 40, film F is transported toward the take-up during the normal run mode of camera operation. For another camera operational mode, shuttle 38 may be controlled to transport a length of film F in a reverse manner.

A camera control 50 is arranged externally of housing 12 to cooperate with a switch 52 in the camera for selectively energizing motor 20 through circuit 54 by batteries 22. In this preferred embodiment, switch 52 comprises a first contact 56 mounted on one end of a lever 58 which lever is pivoted intermediate its length on axle 60 supported within housing 12. A second contact 64 cooperating with the first contact, is mounted on an end of a resilient member, shown as leaf spring 66, fixed at its other end to the housing by a plate or block 68.

The output drive of motor 20, in addition to driving shuttle 38 through known mechanism 36, drives take-up assembly 26 through transmission 24 including a first gear 70 mounted on the motor output shaft 72 and meshed with a second gear 74. A third gear 76 is coupled to a friction coupling or slip clutch (shown schematically at 78) which clutch connects the gear to a shaft 80. Drive transmitted through gear 76 causes rotation of shaft 80, the ends of which are journalled in a secondary partition 82 and a bracket 84 fixed with primary partition 14. As seen in FIG. 2, gearing 88 on shaft 80 is meshed with a take-up driving gear 90 of take-up drive assembly 26. Driving gear 90, shown in FIG. 1 is supported on a shaft 96 with which it is keyed for rotation therewith by keying as indicated at 98. Shaft 96 has a take-up driver shown as lug 100 formed on its film chamber end. Transmission 24 connects motor 20 and take-up assembly 26 to cause take-up driver 100 to rotate continuously in one direction as long as the motor is operating in a normal run mode.

Take-up driver 100 of take-up assembly 26 is arranged to be movable between a retracted inoperative condition in a seat 102 formed as a depression in partition 14, and an operative condition in engagement with finger 34 of the take-up 32 of film cartridge 30. By keying 98 between shaft 96 and gear 90, driver 100 is driven when in either position. Seat 102 includes a tubular sleeve portion 104 defining a bearing in which gear 90 is supported for rotation. The portion of bearing sleeve 104 remote from partition 14 is smaller in diameter than plate portion 108 on which driver 100 of the take-up assembly is supported. The sleeve is set off from the seat portion 102 by an internal annular shoulder 110 which restricts the withdrawal of driver 100 relative to film chamber 18.

Take-up driver 100 is urged from film chamber 18 toward its retracted and inoperative position by a compression spring 112. This spring member is coiled around shaft 96 between gear 90 and a washer 114 which is secured to the end of shaft 96 remote from driver portion 100. In the retracted position, driver 100 is clear of the film chamber surface 116 of partition 14 to enable slidable insertion of a film supply cartridge into the chamber through an access opening (not shown). A cartridge seating spring 118 is arranged to urge the inserted cartridge against locators (not shown) within film chamber 18. When a cartridge is properly located after insertion, shuttle 38 is aligned to engage in perforations of film F and take-up driver 100 is aligned to engage in film take-up 32 of the cartridge.

Control member 50 is supported on an exterior wall 122 of housing 12 for movement about a pivot shaft 126 which is mounted on the housing. Through a pair of actuatable members shown as push buttons 132, 134, control 50 is movable from an off condition (as seen in FIG. 1) to either of a pair of operating conditions, one of which is shown in FIG. 2. Buttons 132, 134 are respectively slidably supported in wall 122 within bearing portions 136. Limiting portions, such as enlarged head portion 138, 140 are formed on or attached to the buttons to limit outward movement thereof, while inward movement is restricted by the components with which the respective buttons cooperate. When control 50 is pushed on the end to depress button 132, the head portion or inner end 138 of that button engages lever 58 on one side of pivot 60, and pushes the lever against the end of shaft 96 to move the take-up driver into operative position. As seen in FIG. 2, the pivotal movement of lever 58 moves the contact 56 into engagement with contact 64 to close switch 52. Upon closure of switch 52, circuit 14 is energized to operate motor 20 so as to drive take-up driver 100. Control 50 is maintained in this depressed condition so long as the operator desires that the camera operate in normal run mode. Upon release of control 50, coiled spring 112 urges shaft 96 into its retracted position, which shaft end forces the end of lever 58 and button 132 to their respective neutral or "Off" positions.

Control 50 may be actuated for another operational mode by depression of the end necessary to push actuator button 134. As shown in dotted lines in FIG. 1, inward movement of button 134 causes the closing of switch 52 thereby energizing motor 20 but without displacing take-up driver 100 into operative position. As lever 58 is pivoted to push button 134, spring 112 maintains shaft 96 in retracted position which shaft maintains button 132 in its inactive position. As film transport 38 continues to feed film about take-up 32, a length of film is wound loosely within the film supply because the take-up is not operating. Preferably, a secondary circuitry or mechanical connections, not shown, would be actuated simultaneously with depression of button 134 to limit the time interval of this operational mode and to initiate other camera functions of that mode. When control 50 is released, leaf spring 66 returns to its inactive or "Off" position to open switch 52 and to urge button 134 to its "Off" position. The once exposed length of film wound loosely in the film supply is available to be rewound for a second exposure. The secondary circuitry or mechanical connection may prevent further film transport unless control 50 is actuated to cause take-up driver 100 to be operative to drive film take-up 32 in film supply 30.

It is to be understood that certain changes, alterations and modifications can be made in the described structure within the principles of the description.

What is claimed is:

1. A camera having motive means for driving a film transport to feed film relative to a film take-up contained in the camera, comprising:
    a film take-up driver being continuously drivable unidirectionally by the motive means and being selectively displaceable axially between an operative take-up engaging position and an inoperative position disengaged from said take-up; and
    control means for alternatively enabling engagement of said take-up driver with said take-up and energizing of said motive means to transport film toward said take-up, and for energizing of said motive means to transport film relative to said take-up with said take-up driver disengaged from said take-up.

2. A camera as in claim 1 including biasing means for urging said take-up driver from engagement with said take-up.

3. A camera as in claim 1, wherein said control means includes first and second actuatable portions, which when alternatively actuated cause said camera to operate in a first mode with said take-up driver engaged and a second mode with said take-up driver disengaged.

4. A camera as in claim 1, wherein said control means comprises a lever pivoted intermediate its length, one end of said lever causing closing of said circuit to energize said motive means as said other end moves said take-up driver into operative engagement with said take-up, and said other end of said lever causing closing of said circuit to energize said motive means exclusive of moving of said take-up driver into operative engagement with said take-up.

5. A camera having motive means for driving a film transport to feed film relative to a film take-up contained in the camera, comprising:
    a film take-up driver being continuously drivable by the motive means and being selectively engageable with said film take-up; and
    control means for alternatively causing engaging of said take-up drive with said take-up and energizing of said motive means, and for energizing of said motive means exclusive of causing engagement of said take-up driver with said take-up, said control means including:
    a pair of independently actuatable means responsive to selective actuation;

switch means operative to cause energizing of said motive means responsive to actuation of one of said actuatable means; and take-up driver shifting means for causing engaging of said driver with said take-up responsive to actuation of said other actuatable means.

6. A camera as in claim 5, wherein biasing means urge said actuating means to a de-actuated position.

7. In combination, a camera, a take-up driver, a motor for operating said camera and take-up driver simultaneously, an electrical circuit for operating said motor, and switch means for energizing and de-energizing said circuit, said switch means comprising two movable contacts, a lever pivoted intermediate its end, one end of said lever engaging said take-up driver, one of said contacts being secured to the other end of said lever, control means including a first and second actuatable portion, said first actuatable portion being engageable with said lever, said actuatable portion being operable to simultaneously move said take-up driver into operative position and said one contact into engagement with said other contact to operate said motor, spring means moving said take-up driver to inoperative position when said first actuatable portion is released, said take-up driver moving said lever to separate said contacts and stop said motor as it is moved to inoperative position, a resilient spring secured at one end and supporting said second contact on the free end, and said second actuatable portion being engageable with said resilient spring to move said second mentioned contact into engagement with said first mentioned contact to operate said motor when said take-up driver is in inoperative position.

* * * * *